(12) United States Patent
Laurell et al.

(10) Patent No.: US 6,778,563 B2
(45) Date of Patent: Aug. 17, 2004

(54) Q-SWITCHED LASER

(75) Inventors: Fredrik Laurell, Danderyd (SE);
Valdas Pasiskevicius, Lidingö (SE);
Boris Ivanovic Galagan, Moscow (RU); Gunnar Karlsson, Kungsängen (SE); Boris Ilich Denker, Moscow (RU); Sergei Evgenievich Sverchkov, Moscow (RU)

(73) Assignee: Cobolt AB, Stockholm (SE)

( * ) Notice: Subject to any disclaimer, the term of this patent is extended or adjusted under 35 U.S.C. 154(b) by 0 days.

(21) Appl. No.: 09/873,372

(22) Filed: Jun. 5, 2001

(65) Prior Publication Data

US 2002/0181513 A1 Dec. 5, 2002

(51) Int. Cl.⁷ .............................................. H01S 3/113
(52) U.S. Cl. ............................ 372/11; 372/10; 372/7; 372/40; 372/71
(58) Field of Search ................................ 372/11, 7, 40, 372/71

(56) References Cited

U.S. PATENT DOCUMENTS

| | | | |
|---|---|---|---|
| 5,495,494 A | * | 2/1996 | Molva et al. ............. 372/98 |
| 5,923,684 A | * | 7/1999 | DiGiovanni et al. ....... 372/6 |
| 5,982,802 A | * | 11/1999 | Thony et al. ............. 372/75 |
| 6,023,479 A | * | 2/2000 | Thony et al. ............. 372/11 |

OTHER PUBLICATIONS

Karlsson et al., "Diode–Pumped Er–Yb:Glass Laser Passively Q Switched by Use of $CO^{2+}$:$MgAl_2O_4$ as A Saturable Absorber," *Applied Optics*, vol. 39, No. 33 (Nov. 20, 2000).
Karlsson et al., "$CO^{2+}$:$MgAl_2O_4$ Crystal as Saturable Absorber for Diode–Pumped QOSwitched Er:Yb Glass Lasers" *Northern Optics 2000*, p. 131 (Jun. 6, 2000).
Wu et al., "$CO^{2+}$:$MgAl_2O_4$ Crystal Passive Q–Switches Performance at 1.34, 1.44 and 1.54 Micron" *OSA TOPS, ASSL* (Davos, Switzerland) pp. 254, (Feb. 16, 2000).

* cited by examiner

*Primary Examiner*—Jerome Jackson
*Assistant Examiner*—Matthew Landau
(74) *Attorney, Agent, or Firm*—Burns, Doane, Swecker & Mathis, L.L.P.

(57) ABSTRACT

A microchip laser arrangement is disclosed. The arrangement is operative to emit Q-switched laser pulses at 1.54 μm. The lasing medium of the laser arrangement is preferably comprised of Yb:Er-glass, and the Q-switch is comprised of a saturable absorber of cobalt doped spinel crystal. The lasing medium is preferably bonded to the absorber to form a monolithic body, upon the surface of which there are deposited dielectric stacks forming a resonant laser cavity. Pumping of the active medium is performed by means of an InGaAs laser diode emitting light at 0.97 μm, corresponding well with the absorption of the Yb:Er-glass material.

12 Claims, 3 Drawing Sheets

# Q-SWITCHED LASER

TECHNICAL FIELD

The present invention generally relates to Q-switched lasers. More particularly, the present invention relates to so-called microchip lasers, which are passively Q-switched by means of spinel type saturable absorbers.

TECHNICAL BACKGROUND

Passive Q-switching of lasers by bleaching of optical filters is almost as old as the laser itself. However, until recently, there were no bleachable filters (i.e. saturable absorbers) suitable for lasers emitting light of wavelengths longer than about 1.1 µm. During the last years, a number of bleachable materials that could be candidates for saturable absorbers in lasers emitting light of wavelengths longer than 1.1 µm have been suggested. However, up to date, all available materials suffer from drawbacks that prevent reliable operation and/or manufacture of such lasers.

For example, semiconductor saturable absorber mirrors (SESAMs) have been proposed as Q-switches. However, these devices have a high susceptibility to optical damage, and therefor limit the available output power of the lasers.

In addition, cobalt-doped dielectric crystals have been proposed. The dielectric host materials proposed include garnets, LMA and ZnSe. These cobalt-doped crystals have an absorption band at the appropriate wavelength. These materials, however, suffer from various drawbacks.

In garnets, the excited state (i.e. the bleached state) lifetime of cobalt ions is much shorter than the duration of a typical Q-switched laser pulse. Therefore, the power build-up will be limited due to the short lifetime of the bleached state.

LMA is a uniaxial crystal, and the absorption cross-section of the cobalt ions in this host depends on the polarisation of the bleaching light. Only in one polarisation direction is the absorption cross-section of the cobalt ions sufficiently large for achieving Q-switching without focusing the laser light onto the bleachable filter.

Also, cobalt-doped ZnSe can be used as a bleachable filter. However, reliable manufacture of this material has failed, leading to poor performance of Q-switched lasers based thereupon.

SUMMARY OF THE INVENTION

It is an object of the present invention to provide a reliable Q-switched microchip laser arrangement. In particular, it is an object of the present invention to provide a Q-switched laser that can be optically pumped by means of a laser diode in a longitudinal configuration.

One advantage of the present invention is that Q-switched operation is achieved for wavelengths around 1.5 µm, which is an eye-safe wavelength. Therefore, the Q-switched laser according to the present invention is suitable for range-finding in urban environments.

Another advantage is that the laser arrangement according to the present invention can be actuated by means of a standard flashlight battery. This fact allows the laser to be portable and hand-held.

These objects and advantages are obtained by a laser arrangement according to the appended claims.

A laser arrangement according to the present invention comprises a first chip of active material operative to emit radiation in the near infrared spectral region; a second chip of optically bleachable material, which can be bleached by radiation in the near infrared spectral region; a pump diode for exciting the active material; two mirrors enclosing both said first chip and said second chip, in order to form a resonant laser cavity; wherein the optically bleachable material comprises a spinel type crystal doped with cobalt ions.

In this specification, the expressions "optically bleachable material" and "saturable absorber" are to be regarded as two different names for the same material. Namely, a material that can achieve an increased transmittance when bleached (saturated) by light, compared to its unbleached (unsaturated) state.

Also, by pumping in a longitudinal configuration, it is meant that the pump light is incident into the active laser material in a direction that is essentially co-linear with the propagation direction of laser light through the active material. Often, this configuration is referred to as longitudinal pumping.

In a preferred embodiment, the active material is Er-glass. Preferably, the Er-glass material also comprises ytterbium ions that promote absorption of pump light and energy transfer to the erbium ions.

The chip of active material can be bonded to the chip of bleachable material, to form a monolithic body. Bonding the two chips together reduces losses in the laser cavity and makes the arrangement smaller in size. Also, the cavity mirrors are preferably dielectric stacks that are deposited directly onto the first chip and the second chip. The present invention allows bonding of the chips to a monolithic body, since no focusing is needed inside the laser cavity for Q-switching to be achieved.

It has been found that when spinel type crystals are made very thin, they tend to bend. In order to prevent this from happening, the chip of spinel type bleachable absorber must be made sufficiently thick. Typically, a thickness of at least 0.1 mm is needed. In order for the small signal (i.e. non-bleached) transmission through the absorber to be high enough for bleaching to occur at such thickness of the absorber, the concentration of cobalt ions in the spinel host must be reduced. Typically, the absorption coefficient of said bleachable absorber is lower than about 1 cm$^{-1}$.

In order to reduce the thermal load on the active material, pump light is preferably launched into the active material through the absorber bonded thereto. When pump light is launched into the active material, the major part of this pump light is absorbed near the surface of the material. By having the material bonded to another material, in this case the absorber, heat is transferred thereto and a cooling effect is achieved.

Suitable materials for the bleachable absorber according to the present invention are a) zinc-aluminum spinel ($ZnAl_2O_4$), b) zinc-gallium spinel ($ZnGa_2O_4$), c) lithium-gallium spinel ($LiGa_5O_8$), and d) magnesium-aluminum spinel ($MgAl_2O_4$). All of these materials are suitable for Q-switching of Er-lasers, the latter of which will be explained in detail below.

BRIEF DESCRIPTION OF THE DRAWINGS

The following description of preferred embodiment is better understood when read in conjunction with the accompanying drawings, on which FIG. 1 schematically shows a first embodiment of a microchip laser arrangement according to the present invention, using mirrors for focusing the pump light, FIG. 2 schematically shows a second embodiment of a microchip laser arrangement according to the present invention, using an optical fibre to guide the pump light, and FIG. 3 schematically shows a third embodiment of a microchip laser arrangement according to the present invention, wherein the pump diode is butt-coupled to the monolithic laser body.

DETAILED DESCRIPTION OF THE PREFERRED EMBODIMENTS

Figure 1:
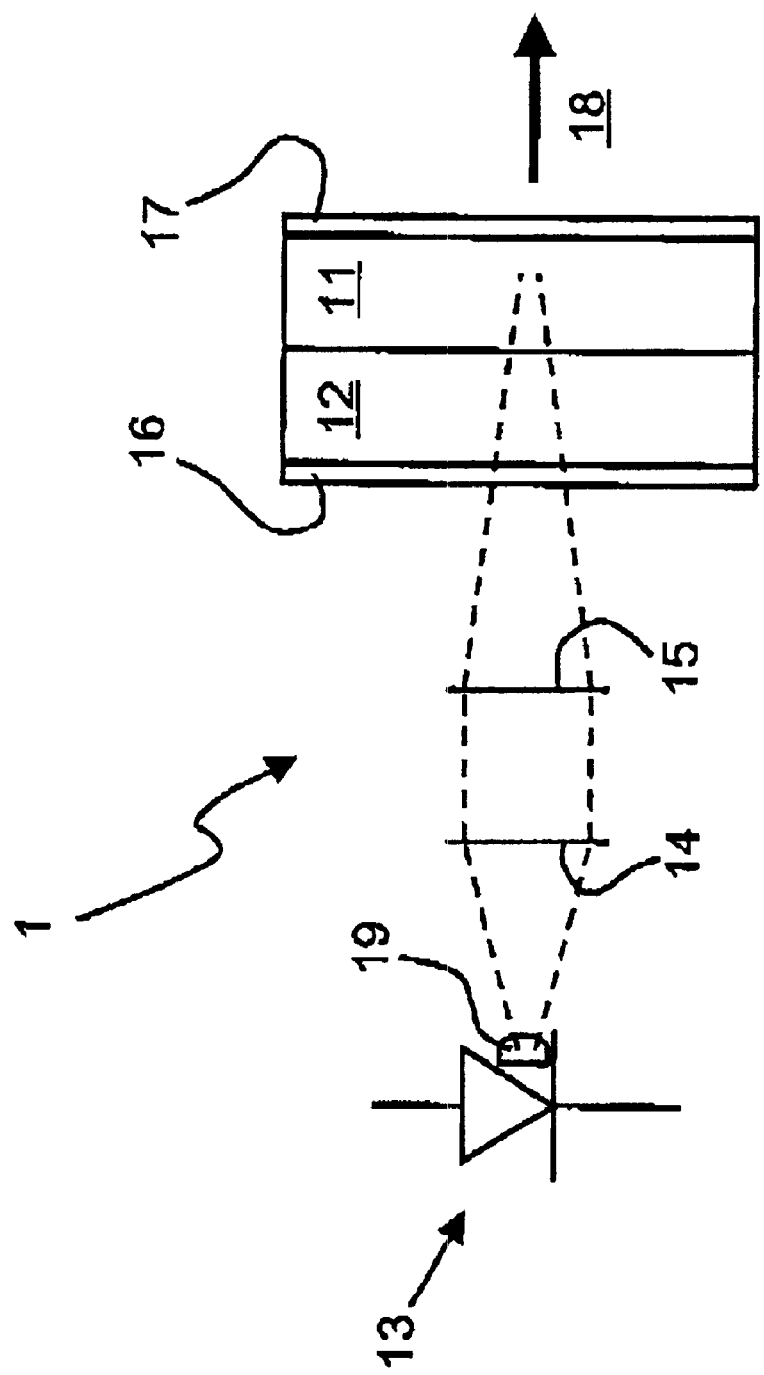

A preferred embodiment of the present invention will now be described with reference to the accompanying drawing.

The Q-switched operation of the laser arrangement is based on saturable absorption in cobalt-doped spinel type materials of light at a wavelength of about 1.3 µm–1.6 µm. The laser light is preferably generated by an active laser medium comprising erbium-doped glass (Er-glass), neodymium-doped yttrium-aluminum-garnet (Nd:YAG) or iodine ($I_2$).

In a preferred embodiment, Er-glass is used as an active medium. Preferably, this active medium also comprises ytterbium. Ytterbium promotes the absorption of pump light and the transfer of energy to the erbium ions.

One example of a spinel type crystal is $MgAl_2O_4$ (magnesium aluminate, also called magnesium-aluminum spinel). This crystal has a cubic structure, and is therefore non-birefringent. The crystal can be grown with excellent quality both by flux-growing method and by Vierneuil method. Cobalt ions doped into this material have an absorption band in the near infrared spectral range (between 1.3 µm and 1.6 µm). Hence, it is suitable for Q-switching of erbium-based lasers such as Er-glass lasers, which emit light at about 1.5 µm. When doped with cobalt, magnesium ions at the tetrahedrally coordinated sites in the spinel crystal are replaced by cobalt ions. The cubic structure and the symmetric surroundings of the cobalt ions ensure isotropic absorption characteristics.

The absorption cross-section of cobalt ions at a wavelength in the near infrared spectral range has been found to be about $1.2 \times 10^{-19}$ $cm^2$ to $2.4 \times 10^{-19}$ $cm^2$, which is at least an order of magnitude larger than the emission cross-section of typical lasers (e.g. Er-glass lasers, Nd:YAG lasers or $I_2$ lasers) emitting in said spectral region. Consequently, no focusing of light onto the saturable absorber is needed inside the laser resonator in order to achieve stable Q-switched operation.

The absorption band of the cobalt ions between 1.3 µm and 1.6 µm originates from the vibronically broadened transition $^4A_2(^4F) \rightarrow {^4T_1}(^4F)$ of the cobalt ions. The ground state absorption cross-section at 1.54 µm, which is the typical emission wavelength of Er-glass lasers, is much larger than the emission cross-section of the erbium ions in the laser material. This makes it possible to obtain efficient Q-switching without any intracavity focusing. The fact that intracavity focusing is not needed allows the design of a microchip laser. As known in the art, microchip lasers are comprised of small chips of laser material and functional elements, such as Q-switches and wavelength converters. Microchip lasers are usually fabricated from wafers, which are diced into a plurality of individual lasers. The fabrication and dicing is performed much like in the field of semiconductors.

Moreover, the excited-state absorption cross-section in cobalt-spinel decreases significantly at 1.54 µm, which results in low losses in Q-switched operation of the laser. Further, the bleached state lifetime of the absorber is conveniently large for Q-switching applications.

A first preferred embodiment of the present invention will now be described in more detail with reference to FIG. 1.

FIG. 1 shows a laser arrangement 1 according to the present invention. The laser arrangement comprises a chip of active material 11 and a chip of optically bleachable material 12 (i.e. a saturable absorber). The chip of active material is comprised of a 1 mm thick Yb;Er-glass plate, The concentration of Er-ions is approximately $1.5 \times 10^{20}$ $cm^{-3}$ and the concentration of Yb-ions is approximately $4 \times 10^{21}$ $cm^{-3}$. These characteristics allow of optical pumping at wavelengths between 940 nm and about 1000 nm. A wide range of different pump sources is thus available in connection with the present invention. The saturable absorber is comprised of a chip of cobalt-doped magnesium-aluminum spinel crystal 12 that is bonded to the chip of active material 11. Hence, a monolithic body of active material 11 and bleachable absorber 12 is formed. The spinel chip has a thickness of about 100 µm and a dual-pass absorption in the unbleached state of about 1.5 percent. The bonding of the chips 11 and 12 together reduces the losses in the laser cavity, thus increasing the average output power of the laser.

The arrangement 1 also includes a diode laser 13 for optical pumping of the active material 11. The diode laser is a single InGaAs diode operated in continuous wave mode. The output from the pump diode is approximately 0.5 W at 0.97 µm. The emitting surface of the diode is imaged onto the chip of active material by, in this case, two lenses 14 and 15 arranged between the diode and the monolithic body of the chips 11 and 12. The pump light from the pumping diode is illustrated by broken lines. In order to provide a primary collimation of the light from the pump diode, it is preferred to have a fibre lens 19 close to the emitting surface of the diode. This fibre lens 19 reduces the divergence of the pump light. On each side face of the monolithic body comprising the chips 11 and 12, there is deposited a respective dielectric stack 16 and 17. These dielectric stacks actually constitute mirrors, and are designed to have reflectivities such that a resonant laser cavity for light at 1.54 µm is formed. The stack 16, closest to the pump diode, has high transmittance for light at the pump wavelength and is highly reflecting for light at the laser wavelength (i.e. at 1.54 µm). The opposite stack 17 is designed to have a transmittance of about 2 percent at 1.54 µm, in order to form an output mirror for the laser light. Preferably, the stack 17 on the output side is highly reflecting at the pump wavelength. In this way, pump light not absorbed during a first pass through the active material is back-reflected a second time through said material, whereby more of the pump light is absorbed. Naturally, this increases the overall efficiency of the laser arrangement. The shown arrangement emits giant pulses of light at 1.54 µm, as indicated by the arrow 18.

Hence, the monolithic body is provided with, on the side facing the pump diode 13, a first dielectric stack 16. This dielectric stack 16 is deposited directly upon the surface of the spinel chip 12, and is highly reflecting at 1.54 µm (the lasing wavelength) and highly transmitting at 0.97 µm (the pump wavelength). On the side facing away from the pump diode, the monolithic body is provided with a second dielectric stack 17. This second dielectric stack 17 is deposited directly upon the Yb:Er-glass chip 11, and has a transmittance of about 1 percent at 1.54 µm, in order to form an output mirror for the laser arrangement.

The laser arrangement shown in FIG. 1 provides an average output power at 1.54 µm of about 40 mW in giant pulses of 2.5 ns in length and with a peak power of 2 kW. The operation of this laser thus provides eye-safe radiation suitable for range-finding and other purposes.

Figure 2:
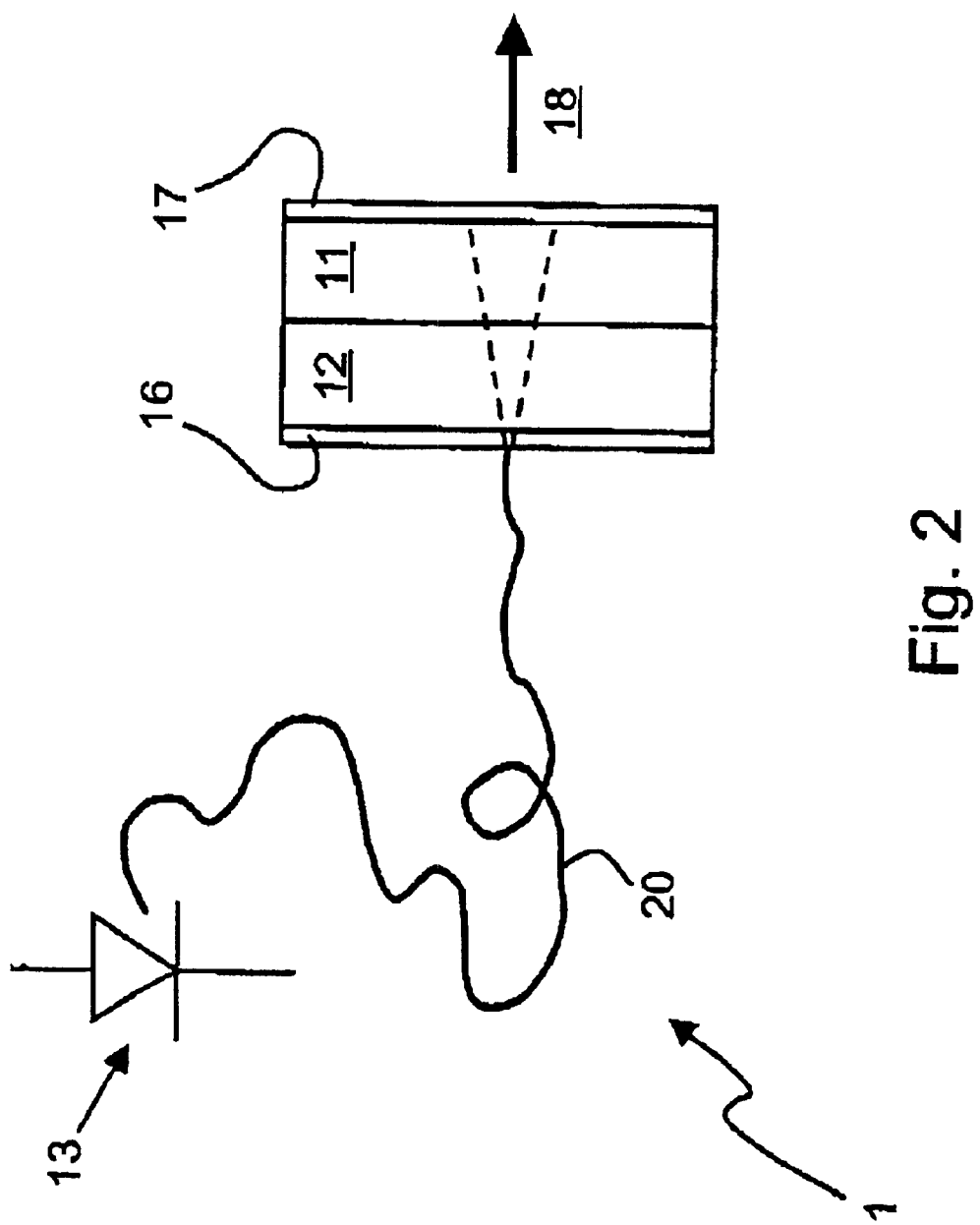

Another embodiment of the invention is schematically shown in FIG. 2. In this case, light from the diode laser 13 is transported to the monolithic body containing the active material 11 by means of an optical fibre 20. Preferably, the optical fibre 20 is pig-tailed to the laser diode 13. In many cases, it is preferred to have a focusing lens between the fibre end and the monolithic body (i.e. between the output end of the fibre and the active material 11). However, for clarity, this is not shown on the drawing. By the arrangement shown in FIG. 2, greater freedom of design is provided, since the diode 13 may be arbitrarily positioned. Similar to the embodiment shown in FIG. 1, dielectric stacks 16, 17 are deposited on the end faces of the monolithic body in order to form a resonant laser cavity.

Figure 3:
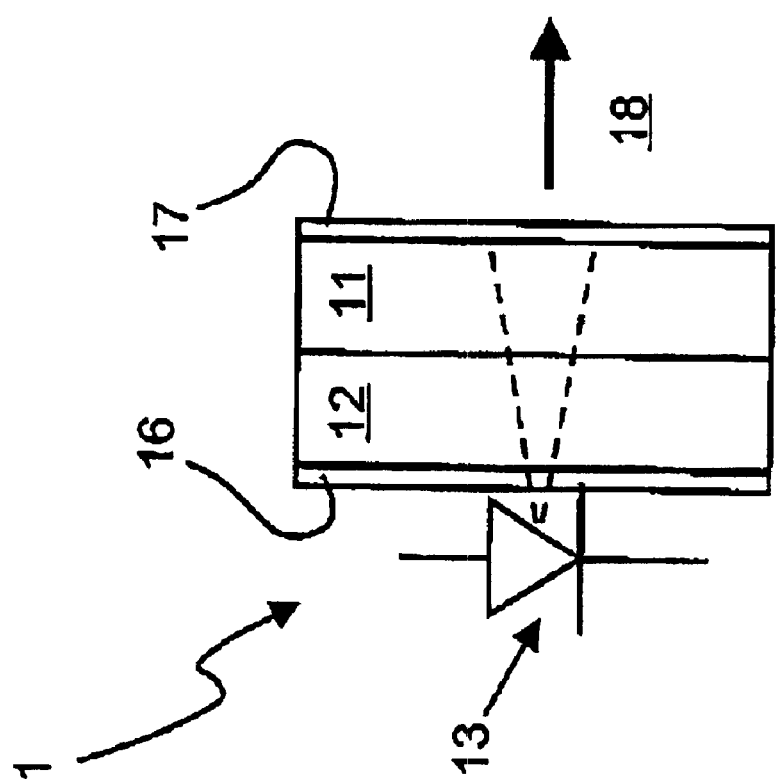

Furthermore, the laser diode 13 could also be butt-coupled directly to the chips, light thereby being emitted directly into the active material without any guiding or focusing, This case is schematically shown in FIG. 3. The butt-coupled arrangement of FIG. 3 is sometimes preferred by virtue of its simplicity of design. Similar to the embodiments shown in FIGS. 1 and 2, dielectric stacks 16, 17 are deposited on the end faces of the monolithic body in order to form a resonant laser cavity.

In another embodiment, the chip of active material and the chip of optically bleachable material are separate, i.e. not bonded together. In this case, the chip of bleachable material is preferably uncoated, in order to provide an etalon effect, This etalon effect lead to operation of the laser arrangement in a single longitudinal mode. Operation in a single longitudinal mode can facilitate operation at higher peak output powers.

In some cases, it might be preferred to have the two chips separate, and to provide anti-reflection coatings on the chips. The step of bonding the chips together is then eliminated. However, in most cases it is preferred to have a monolithic body of active material and saturable absorber.

In conclusion, the present invention provides a laser arrangement that emits Q-switched pulses in the near infrared spectral region. In particular, the laser arrangement according to the invention is a source of eye-safe radiation suitable for range-finding. Furthermore, the arrangement can be powered by a standard flashlight battery.

Although the invention has been described by way of examples relating to Er-glass lasers emitting light at 1.54 $\mu$m, it is to be understood that other wavelengths are conceivable within the scope of the invention. For example, neodymium-doped glass, which emits light at around 1.3 $\mu$m, could be employed.

What is claimed is:

1. A microchip laser arrangement, comprising
   a first chip of active material comprising erbium-doped glass, operative to emit radiation in a near infared spectral region when optically pumped,
   a second chip of optically bleachable solid material, which can be bleached by optical radiation in said near infrared spectral region, said second chip being bonded to said first chip to form a monolithic body,
   a pump diode laser operative to optically pump said active material, and
   a first and second mirror enclosing said first chip and second chip, in order to form a resonant laser cavity,
   wherein said optically bleachable material comprises a cobalt-doped crystal of spinel type,
   wherein the laser diode is arranged for longitudinal pumping of light into the active material,
   wherein the chip of optically bleachable material is positioned closer to the diode laser than the chip of active material, in order for light emitted by the diode to pass through the bleachable material before entering the active material, and
   wherein the thickness of the chip of optically bleachable material is at least 100 $\mu$m.

2. An arrangement as claimed in claim 1, wherein the active material is operative to emit radiation at 1.54 $\mu$m when optically pumped.

3. An arrangement as claimed in claim 1, wherein the length of the chip of active material, in the propagation direction of the laser light, is smaller than about 5 mm.

4. An arrangement as claimed in claim 1, wherein the laser diode emits light in a wavelength range between 940 nm and 1000 nm.

5. An arrangement as claimed in claim 4, wherein the laser diode is an InGaAs diode emitting light at 970 nm.

6. An arrangement as claimed in claim 1, further comprising at least one lens for focusing the light from the diode.

7. An arrangement as claimed in claim 1, further comprising an optical fiber for guiding light from the diode to the active material.

8. An arrangement as claimed in claim 1, wherein mirrors in the form of dielectric stacks are provided on the end surfaces of the monolithic body, in order to form a resonant laser cavity enclosing the active material and the optically bleachable material.

9. An arrangement as claimed in claim 1, wherein the optically bleachable material is comprised of a cobalt-doped crystal selected among $MgAl_2O_4$, $ZnAl_2O_4$ and $LiGa_5O_8$.

10. An arrangement as claimed in claim 1, wherein the length of the chip of active material, in the propagation direction of the laser light, is smaller than about 1 mm.

11. An arrangement as claimed in claim 1, wherein the pump diode laser is a continuous-wave diode laser.

12. An arrangement as claimed in claim 11, wherein the pump diode laser has an output power of less than 1 Watt.

* * * * *